United States Patent [19]

Peters

[11] 4,112,500
[45] Sep. 5, 1978

[54] SMOOTHING OF UPDATED DIGITAL DATA

[75] Inventor: David L. Peters, Whitney Point, N.Y.

[73] Assignee: The Singer Company, Binghamton, N.Y.

[21] Appl. No.: 650,102

[22] Filed: Jan. 19, 1976

[51] Int. Cl.² .................. G06F 3/00; G06F 5/06
[52] U.S. Cl. ........................ 364/900; 340/347 DD
[58] Field of Search ..... 340/172.5, 347 DA, 347 DD; 318/636; 364/200 MS File, 900 MS File

[56] References Cited

U.S. PATENT DOCUMENTS

| 3,573,797 | 4/1971 | Kopelson | 340/347 DA |
| 3,665,417 | 5/1972 | Low et al. | 340/172.5 |
| 3,721,813 | 3/1973 | Condon et al. | 340/172.5 |
| 3,754,235 | 8/1973 | Dummermeth | 340/347 DA |
| 3,812,472 | 5/1974 | Mahood | 340/172.5 |
| 3,870,941 | 3/1975 | Ikenga et al. | 318/636 |
| 3,882,487 | 5/1975 | Rosenburg | 340/347 DA |

Primary Examiner—Mark E. Nusbaum
Attorney, Agent, or Firm—James F. Duffy; Jeffrey Rothenberg

[57] ABSTRACT

Method and apparatus for updating system variables in least significant bit increments during the period between the times the data are normally sampled. In this manner, a smooth transition from one data level to another is achieved rather than a choppy transition at sampling iteration rates.

8 Claims, 4 Drawing Figures

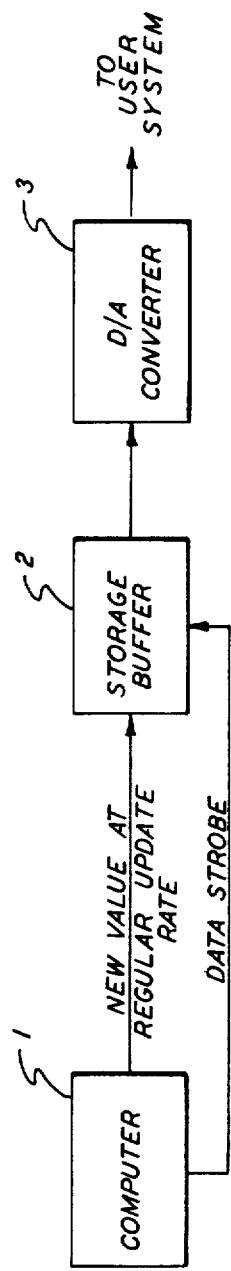
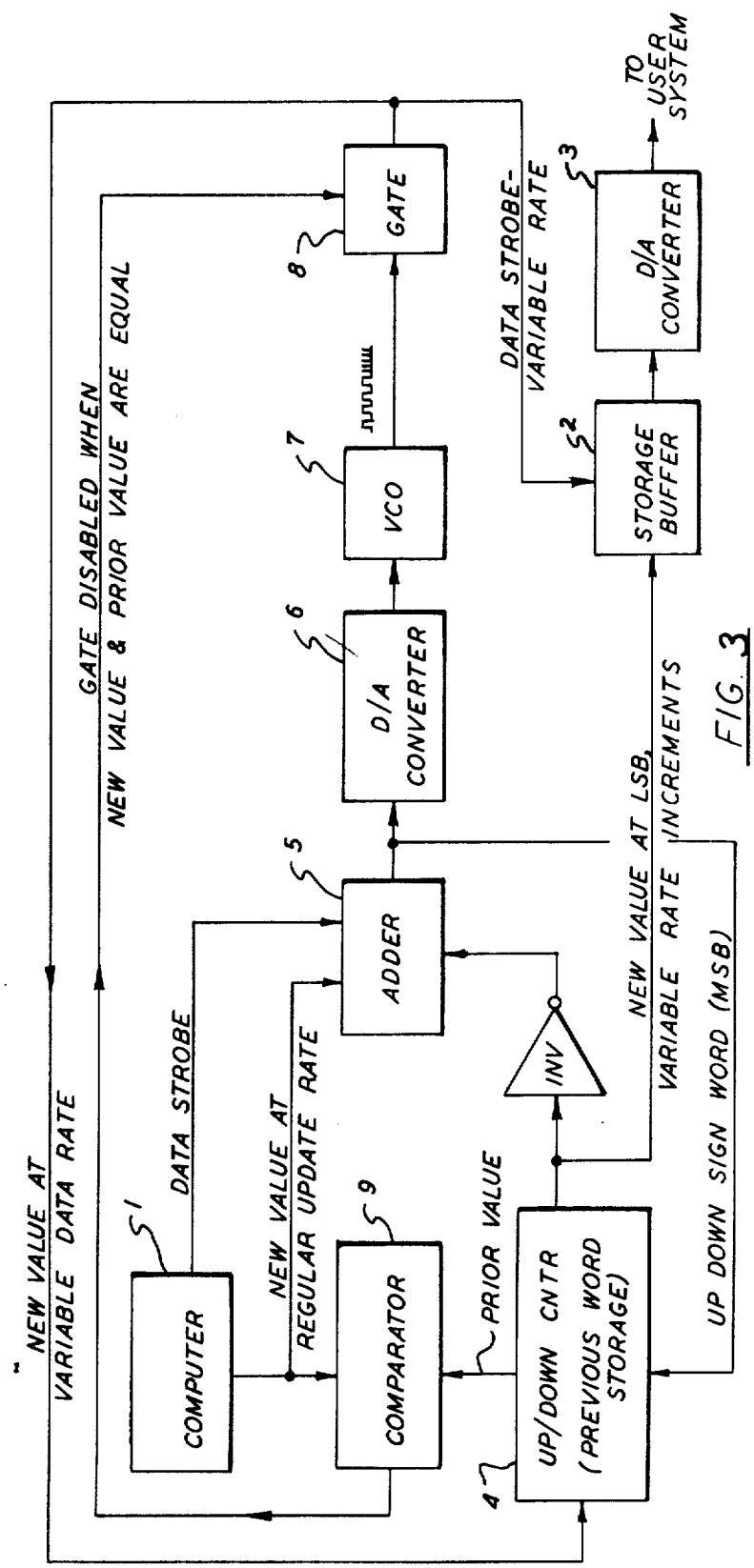

SMOOTHING OF UPDATED DIGITAL DATA

The invention herein described was made in the course of or under a contract, or subcontract thereunder, with the Department of the Navy.

BACKGROUND OF THE INVENTION

1. Field of the Invention

The invention relates to real time computer systems having relatively low iteration rates for computer calculation updates. In particular, the invention relates to the provision of higher iteration update rates to the user system responsive to a computer, itself having relatively low update iteration rates.

2. Description of Prior Art

In real time dynamic computer systems, it is essential that the information used by the computer, to perform its calculations, be constantly updated. In digital systems this information is updated at iteration rates typically on the order of 15 to 30 cycles per second. If the information input to the computer is changing at high dynamic rates, a severe burden may be placed on the user system as it drives to react to the changed situation indicated each time the information is updated. For example, if the user system comprises highly responsive servomechanisms, a large change in the input could result in servo saturation. This could lead to lock-up or unwanted responses such as overshoot and ringing. Similarly, if the end-user system is a visual display presenting rapidly changing conditions, a noticeable stepping in the visual presentation (a glitch) may appear which is readily apparent to the eye of the observer.

It shall be a purpose of this invention to provide an interface between a computer having a low iteration update rate and user equipment responsive to the output of that computer, such that the interface provided by the invention allows the responsive system to be updated at a relatively high iteration rate. It shall be a further purpose of the invention to avoid the problems of unwanted system responses inherent in some systems as a result of large input step changes by updating the responsive system in least significant bit increments.

There are two methods generally employed in prior art to overcome the large step change which may occur in highly dynamic systems having low iteration update rates. The first of these is a value feedback system which feeds the derivative of the computer output to an integrator and uses the integrator's results to control the user system. For highest accuracy, it is necessary to close the loop back to the computer to verify the integrated results and adjust the derivative to the desired value. This system requires highly stable integrators and is operable only when the system is a direct function of the computer output or of a varying steady state condition. In a dynamic system in which the rate of change in value or phase must be adjusted, the value feedback system finds little or no application.

A better approach to solving the problem divides the period in which the information is updated into a fixed number of equal, incremental time segments. The new data values are then presented to the user system in incremental steps equal to the number of such time segments within the iteration period of the computer. A fixed clock is used to determine the equal incremental time segments. Although the system is superior, it still does not preclude data changes in larger-than-desired steps since there is no attempt to present the data at rates allowing least significant bit incrementation. The system also requires complex microcircuits, parallel multipliers and adders-substrators.

It shall be a further objective of this invention to provide data changes in least significant bit increments at a variable rate within the period at which data is normally updated to the system, while avoiding the complexity and the static time increments of the fixed clock system.

SUMMARY OF THE INVENTION

The updated data word is compared with its previous value and a delta ($\Delta$) word is derived. The delta word is converted from digital to an analog voltage and is used to control a voltage-controlled oscillator. The output of the voltage-controlled oscillator is gated to the previous word storage causing the previous word to be updated in least significant bit increments. The previous word storage is updated by the voltage controlled oscillator at variable data rates. The new data value is then made available to the user system in least significant bit increments, at higher update rates than the normal iteration update rate of the system.

BRIEF DESCRIPTION OF THE DRAWINGS

FIG. 1 is a block diagram of prior art methods of updating data to the user system.

FIG. 3 is a block diagram illustrating the invention as it interfaces between the computer and the user system to provide a high incremental rate of data update to the user system.

DESCRIPTION OF THE INVENTION

In an analog computer system, data changes smoothly and is available instantaneously to the system as updated values for computation. The problem is different, however, in digital computer systems in which data changes incrementally and must be input to the computer system on a non-interferring basis with the normal functions of the computer. Real time, digital computer systems regularly provide that data values be updated at a rate on the order of 15 to 30 cycles per second. In highly dynamic systems this relatively low iteration rate of computer update may lead to problems already noted.

FIG. 1 is a simplified illustration of the prior art technique for updating data to a user system. Computer 1 provides the new data values to storage buffer 2. A strobe from the computer controls the input to the storage buffer. From buffer 2, the data is fed out to D/A converter 3 from whence it is fed to the user system.

Figure 2:
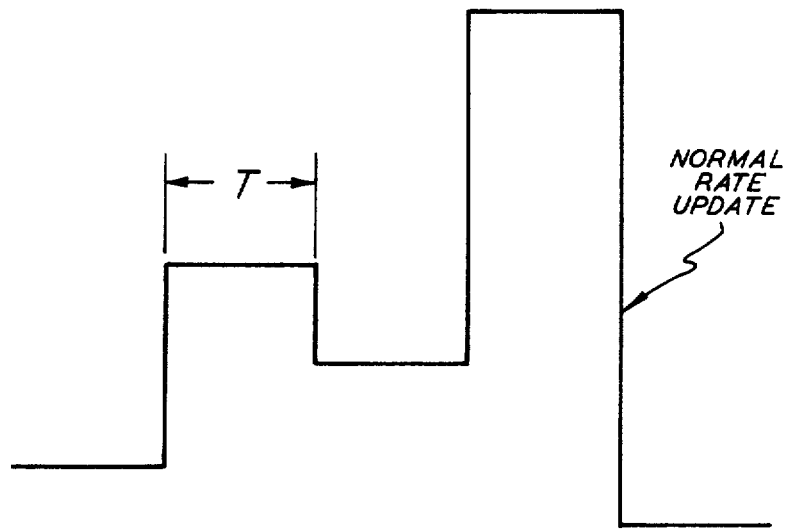
FIG. 2 suggests the excursion the data may experience at the relatively low iteration rates of prior art systems.

FIG. 2 illustrates three periods, $T_4$, at the iteration update rate of the prior art system of FIG. 1. As may be seen, large excursions in the value of the data may occur between iteration periods.

FIG. 3 is a block diagram illustrating the invention as it interfaces between computer 1 and storage buffer 2 of the prior art system illustrated in FIG. 1. The output of computer 1 is considered to be in 2's compliment format which is typical of many of today's computer systems (example only).

The output of computer 1 and the inverted output of previous word storage, up/down counter 4, are combined in adder 5 to provide a delta word. The delta word has a value representative of the change in value of the data as it was prior to being updated and as it now is at the new update. The delta word is fed into D/A converter 6 and the analog output is used to control the output of voltage controlled oscillator 7. The output of voltage controlled oscillator 7 will be at a variable rate determined by the magnitude and sign of the delta word.

The output of voltage controlled oscillator 7 is gated by gate 8 which in turn is controlled by the output of comparator 9. Comparator 9 compares the previous word value from up/down counter 4 with that of the new value provided by computer 1. So long as there is a difference between the two words, a gate signal will be provided to gate 8 to allow the output of voltage controlled oscillator 7 to be fed out to the system.

The output of gate 8 provides two functions. It strobes the output of up/down counter 4 into storage buffer 2. It also updates up/down counter 4 in least significant bit increments. Each pulse gated through gate 8 from voltage controlled oscillator 7 causes up/down counter 4 to increment by one least significant bit. The new value from up/down counter 4, in least significant bit increments, at variable data rates, is fed into storage buffer 2 in accord with the strobe from gate 8. The output from storage buffer 2 is fed to D/A converter 3 from where it is made available to the user system.

The most significant bit in the delta word output of adder 5 is fed to up-down counter 4 as a sign-word to determine whether counter 4 shall count up or count down.

Figure 4:
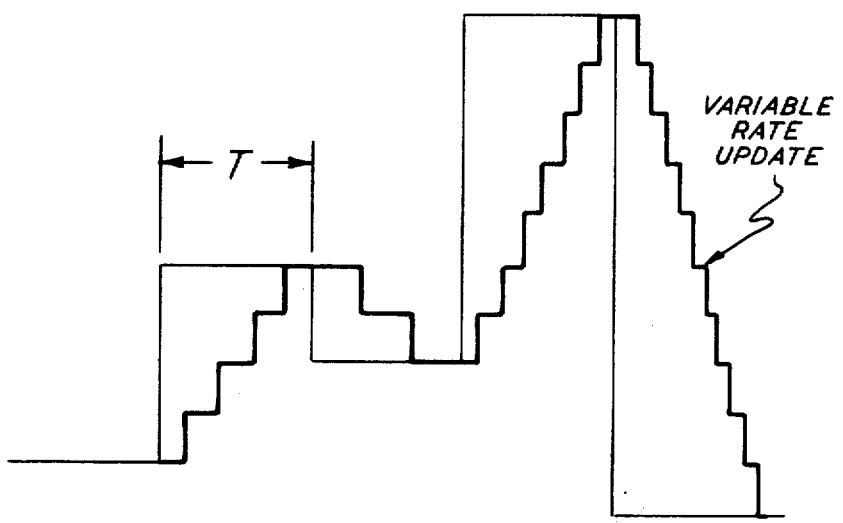
FIG. 4 illustrates the invention's least-significant-bit update at variable iteration rates within the period of the relatively low iteration update of the prior art system.

FIG. 4 illustrates the effect of the invention in providing a relatively high iteration rate of data update to a user system having a computer whose program is updated at a relatively low iteration rate. It may now be seen that the maximum data change which will be seen by the system will occur in least significant bit increments. The rate at which the data is changed is a function of the change which occurs between normal computer updates; that is, it is a function of the magnitude of the delta word out of adder 5. Data changes are fed to the user system only at the time data actually changes since storage buffer 2 is strobed by the output of gate 8.

In summary then, a delta word is derived whose value represents the change which has occurred in the computer output since the last time the computer was updated. The delta word controls voltage controlled oscillator 7, i.e., the oscillator's output will vary in accord with the magnitude and sign of the delta word. The output of oscillator 7, fed through gate 8, controls the rate at which up/down counter 4 operates, i.e., counts, and counter 4 increments one count at a time at a rate determined by the output of oscillator 7, which in turn is controlled by the delta word. Thus, the user system, rather than being commanded to drive directly to the status determined by the newly updated data from the computer, will rather advance toward that status in incremental steps each time counter 4 increments one count. This advance will be at a rate determined by oscillator 7, which is controlled by the delta word. Therefore the greater the change in input data, the greater the delta word, and the greater the number of incremental changes fed to the user system between updates from the computer itself. Since each increment (or decrement) of counter 4's outut is by one count only, the user system is said to be updated in least significant bit increments.

When the end user system is a visual display, data changes which occur during display time could cause visible glitches in the system output. In this case, it is necessary to output the updated word from counter 4 to storage buffer 2 in time-synchronization with the horizontal or vertical drive of the display system so that data changes are incorporated only during blanking time.

Because the visual display sync signal and the variable rate data strobe from gate 8 will not normally be in time synchronization, it is seen that occasionally data changes of greater than the least significant bit changes will result. However, the incremental changes occurring in the visual system will still, in general, be much less than that which would be experienced if the changes were occurring only at the normal iteration rate of 15 to 30 cycles per second, typical of many systems today, since the system will be synchronized at the field or line frequency of the visual display.

Method and apparatus for updating user system data in least significant bit increments at variable data rates, which rates exceed the nominal update iteration rate of the computer system, have been disclosed. It will be obvious to those skilled in the art that various changes and modifications may be made without departing from the invention. It is therefore intended to cover herein all such changes and modifications as fall within the true spirit and scope of the invention.

What is claimed is:

1. In a digital computer system in which data is updated periodically, a method for interfacing a computer and a user system which is responsive to said computer, whereby updated data is transmitted to the user system, at variable data rates, relatively higher than the nominal data update rate of the computer, and in least significant bit increments comprising the steps of:
   (a) determining, at the nominal computer update rate, a delta word that is the difference between the value of the data prior to update and its value when updated;
   (b) converting said delta word into a signal whose output frequency is proportional to the magnitude of said delta word;
   (c) using said signal to update said prior data to new values in least significant bit increments; and
   (d) strobing said new values out to the user system.

2. The method of claim 1 in which the procedure for converting said delta word into a signal whose output frequency is proportional to the magnitude of said delta word further comprises: applying said delta word to the input of a D/A converter whose output is coupled to the input of a voltage controlled oscillator (VCO), whereby the analog output of the D/A converter determines the frequency of operation of said VCO.

3. In a digital computer system in which data is updated periodically, an interfacing apparatus located between a computer and a user system which is responsive to the computer, wherein updated data is transmitted to the user system at variable data rates, relatively higher than the nominal data update rate of the computer, and in least significant bit increments, comprising:
   (a) a first source of data updated at the nominal update rate of the computer;
   (b) a second source of data at values prior to update;

(c) means for determining, at the nominal update rate of the computer, a delta word which is the difference between the values of the data from the first source and the data from the second source;
(d) means responsive to said delta word for converting said delta word into a signal whose output frequency is proportional to the magnitude of said delta word, and for updating said second source of data in least significant bit increments at an incremental rate determined by the output frequency of said signal; and
(e) means to forward said incrementally updated data from said second source of data out to the user system.

4. The apparatus of claim 3 in which said first and second sources of data, output data in 2's complement format and the means for determining said delta word comprise:
   (a) an adder, strobed by the computer at the nominal computer update rate, having as one of its inputs the first source, and as a second input, the output of
   (b) an inverter, which has as its input the output of said second source of data, whereby the output of said adder is said delta word.

5. The apparatus of claim 3 in which the means for converting said delta word comprises:
   (a) a voltage controlled oscillator (VCO) whose output is coupled to said second source of data; and determined by the output of said VCO; and
   (b) a D/A converter having as its input the delta word and whose output is coupled to the input of said VCO whereby the analog output of said D/A converter determines the frequency of operation of said VCO.

6. The apparatus of claim 3 wherein the means to forward said incrementally updated data from said second source is an output from the means used to update said second source to strobe the output of said second source out to the user system.

7. The apparatus of claim 5 in which the means to forward said incrementally updated data from said second source is an output from said VCO used to strobe the output of said second source out to the user system at a frequency determined by the frequency of operation of said VCO.

,13

8. In a digital computer system in which data is updated periodically, an interfacing apparatus located between a computer and a user system which is responsive to the computer, wherein updated data is transmitted to the user system at variable data rates, relatively higher than the nominal data update rate of the computer, and in least significant bit increments, comprising:
   (a) a first source of data updated at the nominal update rate of the computer;
   (b) a second source of data at values prior to update;
   (c) an adder, strobed by the computer at the nominal computer update rate, having as one of its inputs the data from said first source, and as a second input, the output of
   (d) an inverter, which has as its input the output of said second source of data whereby the output of said adder is a delta word which is the difference between the values of the data from the first source and the data from the second source;
   (e) a voltage controlled oscillator (VCO) whose output is coupled to said second source of data causing said second source to update its data in least significant bit increments at a frequency determined by the output of said VCO;
   (f) a D/A converter having as its input the delta word and whose output is coupled to the input of said VCO whereby the analog output of said D/A converter determines the frequency of operation of said VCO; and
   (g) an output from said VCO to strobe the output of said second source out to the user system at a frequency determined by the frequency of operation of said VCO.

* * * * *

UNITED STATES PATENT AND TRADEMARK OFFICE
CERTIFICATE OF CORRECTION

PATENT NO. : 4,112,500
DATED : September 5, 1978
INVENTOR(S) : David L. Peters

It is certified that error appears in the above—identified patent and that said Letters Patent are hereby corrected as shown below:

Col. 5, line 29, "determined by the output of said VCO; and" should be deleted.

Signed and Sealed this

Seventeenth Day of July 1979

[SEAL]

Attest:

LUTRELLE F. PARKER

Attesting Officer  Acting Commissioner of Patents and Trademarks